March 1, 1966 D. M. KELLEY 3,238,508

LOGICAL MANIPULATOR

Filed Dec. 18, 1961 3 Sheets-Sheet 1

INVENTOR
DONALD M. KELLEY

BY [signature]

ATTORNEY

March 1, 1966 D. M. KELLEY 3,238,508

LOGICAL MANIPULATOR

Filed Dec. 18, 1961 3 Sheets-Sheet 3

““United States Patent Office 3,238,508
Patented Mar. 1, 1966

3,238,508
LOGICAL MANIPULATOR

Donald M. Kelley, Lake Katrine, N.Y., assignor to International Business Machines Corporation, New York, N.Y., a corporation of New York Filed Dec. 18, 1961, Ser. No. 159,922
12 Claims. (Cl. 340—172.5)

The present invention is directed to apparatus for logically manipulating data, particularly for effecting such manipulations within a stored program computer.

In a computer it is sometimes desirable or even necessary to modify one set of data by another set of data in accordance with one of a set of rules of logic in order to implement the execution of a program of data processing steps. For purposes of description, each such set of data is hereinafter referred to as "a data word" or "word" and is considered to be a finite number of ordered bits (usually binary). In this frame of reference, the value of resultant bits derived by manipulation or modification is considered to be a function of the value of bits within the word and the value of similar (usually corresponding) bits in a modifier word as well as a selected logical rule. Thus the bits of the word to be modified may be meant for Boolean combination with the bits of the modifier word in logical add, logical multiply, exclusive-OR or another operation of similar nature. The resultant bits form a word which may be used later in the course of execution of succeeding program steps.

In the past, stored program computers have been arranged to effect such logical manipulations. Usually these operations have been carried out in the so-called arithmetic element because that element has registers and gating apparatus and is otherwise equipped for effecting arithmetic manipulations on data words. It is the usual practice to express the bits of the word to be modified in a first register which hereinafter may be called the "accumulator" and the bits of the modifier word in a second register which hereinafter may be called the "A register." In such an arithmetic element, the commonplace practice of always storing the resultant bits (both arithmetic and logical) in the accumulator may be followed.

In a first approach to the problem, in addition to the apparatus normally used for carrying out arithmetic operations, there are provided groups of apparatus, each of which interconnects the A register and accumulator and is operative under the control of the stored program for carrying out a single, unique logical operation between the various bits expressed in those registers. Such an approach has several disadvantages including the necessity for providing the special purpose, non-arithmetic apparatus groups, as well as the necessity for providing special program steps for each apparatus group in order to direct the operation thereof.

In order to overcome at least a part of the above-named disadvantages, a second approach to the problem uses a single instruction word under which the logical operation is initiated. It is the purpose of the instruction word to control the generation of commands for selectively operating a single, general purpose group of apparatus within the arithmetic element, which apparatus group interconnects the A register and accumulator and is effective to cause resultant bits to be stored in the accumulator. In order to direct the generation of the unique command sets individual to the various logical manipulations, there are reserved for use certain bits in the instruction word for identifying the manipulation to be effected. An example of apparatus constructed to use such a specially generated command set is shown by D. Doman on page 34 of the IBM Technical Disclosure Bulletin, volume 2, number 4, December 1959.

While the second approach represents an advance over the first, the apparatus tends to be less flexible than might be desired in that the word bits to be modified are always stored in the accumulator. An illustration of the effects of this inflexibility is found in a computer having an arithmetic element in which the accumulator register is loaded via the A register from any memory register or an addressable register within other, non-memory elements, where the destruction of the originally expressed word to be modified in the accumulator may require the provision of extra storage media (registers) within the arithmetic element as well as extra program steps to direct transfer of words among the registers of the element. Further, the apparatus is of a nature that does not lend itself to internal checking operations.

Accordingly, it is an object of the present invention to provide new and improved apparatus for effecting the logical manipulation of data.

Another object of the invention is to provide new and more flexible apparatus for effecting logical manipulation of data.

Another object is to provide apparatus for effecting logical operations on data the operation of which is easily checked.

Another object of the apparatus is to provide for the logical manipulations of data at reduced cost in equipment and requiring fewer program instructions.

In accordance with the principles of the present invention, there is provided a system having first and second means, such as first and second registers, operative for producing signals representing first and second sets of data, respectively. For instance, each such register may comprise at least one element which is directively operative to produce signals expressing (representing) data.

In order to selectively express each of a set rules of logic to be used in combining the value of data expressed by the first and second means, there is provided a generator directively operative for issuing any one of a set of command signals. For instance, commands of each set may occur sequentially, with certain commands in each such set representing the value of a resultant for one of the possible combinations of values which may be expressed among corresponding elements of the various registers. By way of further illustration, other commands within each set may be used for sequencing (cycling) the register elements from the states to which they have been directively operated through all possible combinations and then restoring the register elements to the operated combination in which they were originally, directively placed for reasons to be made apparent.

There is provided means for selecting one of the first and second means to express the resulting data set. The latter means may be placed under the control of the command generator.

In order to determine the combination of values of data sets originnally placed in the above-mentioned first and second means and the value by which data in the selected one of the above-named first and second means is to be modified, there is provided sensing means coupled to and conditioned in accordance with the value of data expressed in those first and second means. For instance, the sensing means may include serially connected gates conditioned only upon the expression of a particular combination of values by the first and second register elements and effective in condition state to pass a signal from a sampling input to an output. The sensing means is operated under the control of signals from the command generator and is effective to produce signals representing the difference by which the value of the data originally placed in a selected one of the first and second means is to be modified in order to express the resultant data.

In order to save such difference-indicating signals, there is coupled to the sensing means another means, such as the element of a third register, operative for temporarily storing signals produced by the sensing means.

In order to derive a resulting data set, there is further provided means operative in response to signals generated by the temporary storing means to cause the selected one of the first and second means to generate signals expressing the resultant data set. The last named means may be operative under the control of the command generator and include apparatus effective after the sensing means has operated for directively transferring the contents of the selected register into the first register, apparatus effective to combine the data now expressed in the first register with the signals generated by the temporary storing means register, as well as means to retransfer the resultant data set to the selected register.

The foregoing and other objects, features and advantages of the invention will be apparent from the following more particular description of a preferred embodiment of the invention, as illustrated in the accompanying drawings.

Figures 1, 2, 3A:
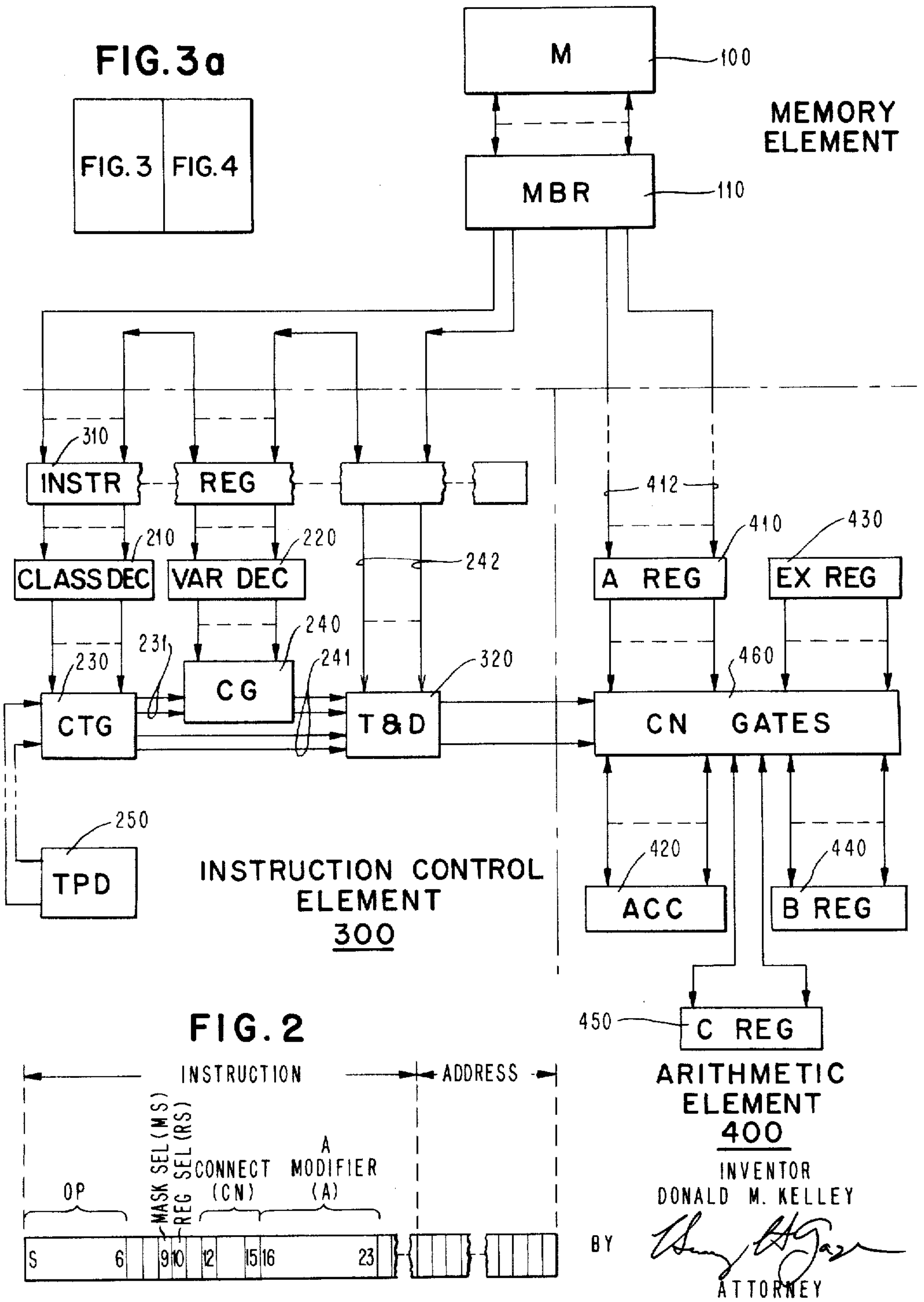
FIG. 1 shows a skeletonized stored program computer of a type in which the present invention may be practiced.
FIG. 2 shows the format of an instruction word of the CONNECT class suitable for use in the instruction control element of a computer during the performance of a logical operation.

In the figures of the drawing, the next-explained series of conventionals is employed. An arrowhead on a lead or conductor indicates (1) a circuit connection (2) energization with a "pulse" or "level" and (3) the direction of information transfer. No distinction between "pulses" and "levels" is shown in the drawing. However, such distinction exists and will be readily understood by those skilled in the art, especially in the light of the use to which the components (circuits) shown in the drawings are put. Such components are shown as blocks in FIGS. 3 and 4 and are identified by bold-face characters appearing within such blocks. These characters represent the common name of the component. For instance, FF designates a flip-flop, G a gate, and OR a logical OR circuit. A variety of circuits suitable for the performance for each of these functions is known in the art. However, the preferred type of components are disclosed in the copending application Ser. No. 824,199, filed June 30, 1959, by Carroll A. Andrews et al., and entitled "Magnetic Core Transfer Matrix," and assigned to the same assignee as the present invention.

GENERAL DESCRIPTION OF THE COMPUTER

In order to assist the reader in understanding the present invention, there is next presented a review of the parts of computer elements, the operation of which is pertinent to the present invention. It is pointed out that a more complete description of the logical organization and general operation of such a computer is to be found in U.S. Patent 2,914,248 to H. D. Ross et al., issued November 24, 1959, and assigned to the same assignee as the present invention.

Referring to FIG. 1, an instruction word in a program of such words stored at specific locations in memory 100 is selected for use and is transferred through memory buffer register 110 to instruction register 310 within instruction control element 300 by apparatus not shown. Upon the insertion of the instruction word in register 310, the outputs of register 310 are energized in accordance with the value of the bits which comprise the word inserted. The outputs controlled by a first part of the bits forming the instruction word are decoded in Class Decoder 210 and Variation Decoder 220, while certain of the remaining bits are used to directly control apparatus within Transfer and Decoder Gates 320. Upon the completed decoding of the instruction word inserted in register 310, conditioning inputs of Class Timing Gates 230 and Command Generator 240 are suitably energized and therewith prepared for producing output signals (commands) to be used in the course of carrying out the various operations which are used in the execution of the instruction which is currently expressed in register 310. In order to generate the above-mentioned commands, the other (sampling) inputs of Class Timing Gates 230 are sequentially sampled by pulses produced on the outputs of Time Pulse Distributor 250. Consequently there are produced on a selected set of outputs, such as 231, of gates 230 a sequence of pulses which in turn are applied to the sampling inputs of the Command Generator 240, while other outputs of gates 230 are applied to the sampling inputs of Transfer and Decoder Gates 320. Certain of the combined outputs of Generator 240 and Gates 230 are coupled by conductors collectively indicated as 241 to the sampling inputs of Transfer and Decoder Gates 320. The latter, having been conditioned from the outputs of register 310 thereupon generates at its own outputs a series of command pulses in accordance with the nature of the instruction word. The latter commands are in timed relationship to each other and are distributed to other computer elements for effecting the various operations throughout the computer as dictated by the instruction word currently held in register 310.

At the time that the commands are being issued from Generator 240 and from Gates 230 and 320, data words from specified locations in memory 100 have been transferred under the control of means not shown through register 110 to various registers such as A Register 410 and Accumulator 420 within Arithmetic Element 400. The above-mentioned commands incoming to Element 400 at such a time serve to directively operate control apparatus within element 400, such as Connect Gates 460, for the purpose of arithmetically manipulating or performing other operations on quantities or other values expressed in the various Element 400 registers. While the apparatus for effecting such arithmetic operations is not shown in FIG. 1, it is to be readily appreciated by those skilled in the art that such apparatus exists and is well known and understood.

In the contemplated computer, the Element 400 and its control apparatus is arranged so that data words from Memory 100 are loaded into Accumulator 420 by way of A Register 410, and so that an operand expressed in Accumulator 420 is written over in the course of arithmetic operations to express the result (partial or final) in the course of carrying out certain arithmetic functions in Element 400. Thus, casual consideration shows that in regular operation of Element 400 the quantity originally expressed in Accumulator 430 at the outset of execution of an operation is destroyed.

ENVIRONMENT OF THE CONNECT INSTRUCTION

In the course of executing a program of instructions stored within memory 100, it may be necessary to modify certain data in conformity with logical rules. This modification is to take place under the control of an instruction word of a class which may hereinafter be referred to as CONNECT. In the contemplated invention, it is assumed that sets of words of equal bit length representing data to be used in these manipulations have been moved from Memory 100 to Register 410 and Accumulator 420, and further that a word containing a similar number of bits has been stored in B Register 440. The purpose of the word stored in the latter register is to be explained more fully hereinafter. Similarly, it is assumed taht Exchange Register 430 and C Register 450 have been cleared in anticipation of the logical operations which are to be described.

It is further contemplated that the various registers in Element 400 comprise series of ordered, binary storage elements, such as flip-flops, each of which has been directively operated (in the above-mentioned process of loading registers) to either of two bistable states to therewith produce a signal on its 0 or 1 outputs representing a value (arithmetic or logical). In the logical manipulations which are contemplated here, it is to be understood that the ordering of the data in words to be modified is such that bits inserted in corresponding positions or stages of Register 410 and Accumulator 420 are of like class, so that the logical manipulation of bits expressed in one register in terms of bits expressed in the other yields a meaningful resultant. It is further pointed out that while the preferred embodiment of the present invention is practiced in apparatus employing binary elements, no theoretical reason exists to prevent the presently considered invention from being practiced with elements using other than binary logic. Similarly, no theoretical reason exists to prevent the present invention from being used in situations where more than two sets of data are to be logically manipulated and are appropriately expressed in a suitable number of registers of the above-described type.

Each of the CONNECT instructions used in the presently contemplated computer for directing the logical manipulation of data within arithmetic element 400 has a format shown in FIG. 2. For instance, signals derived in Instruction Register 310 from operation and variation bits S–6 direct the operation of Decoders 210 and 220, while the signals derived from bits 9, 10 and 12–15 direct the operation of Transfer and Decoder Gates 320. Signals derived from bits 16–23 (A modifier) are used as a so-called configuration control for controlling the operation by byte on words in Register 410 and Accumulator 420. Since the latter function is independent of the apparatus used in the present invention, the purpose of these bits is not described further except to say that in the absence of bit masking in the instruction word (yet to be described), it is assumed that logical manipulation is carried out in all elements of A Register 410 and Accumulator 420.

Bit 9 is the so-called mask selector bit. When a 0 is written into the instruction word at bit 9 it is intended that all bits of a word to be modified be considered active (i.e., subject to modification). However, when a 1 is written into instruction word bit 9 it is intended that only those bits of a word to be modified be considered active which correspond to a 1 bit already written into B Register 440 of Arithmetic Element 400. In the case where the mask bit of the instruction word its set to 1 and bit of the word to be modified corresponds to a bit position in B Register 440 in which a 0 has been written, it is intended that logical operations be masked (suppressed) with respect to that bit only.

Bit 10 of the FIG. 2 instruction word is used as a result-store indicator. Bit 10 set to a 0 indicates that the bits resulting from logical modification operations performed on bits of the word initially expressed in Accumulator 420 be written over the originally expressed word. Bit 10 set to a 1 indicates that bits resulting from logical modification operations are performed on the bits of the word initially expressed in A Register 410 be written over the originally expressed word.

The bits 12–15 of the instruction word are reserved for the so-called CONNECT instruction and define for each possible combination of quantities expressed in any and each of the various pairs of corresponding storage elements within A Register 410 and Accumulator 420 the resultant value of the corresponding bit to be written in the one of Registers 410 and 420 selected to receive resultant bits in accordance with the value of instruction word bit 10. To this end, each of bits 12–15 is considered to correspond to a particular combination of values which may be expressed in corresponding bit position pairs of registers 410 and 420. More specifically, bit 12 is associated with the combination of a 0 bit in register 410 and a corresponding 0 bit in Register 420; bit 13 is associated with the combination of a 0 bit in Register 410 and a corresponding 1 bit in Register 420; bit 14 is associated with the combination of a 1 bit in Register 410 and a corresponding 0 bit in Register 420; and bit 15 is associated with the combination of a 1 bit in Register 410 and a corresponding 1 bit in Register 420.

With this assignment of bits 12–15, there is further coupled the definition that a 1 or a 0 written into any one of these bit positions defines the value of the resultant bit in the event that the particular combination of A Register and accumulator bits occurs in Registers 410 and 420. With this arrangement, it is to be seen that by selectively writing combination of 0's and 1's into bits 12–15 any possible manipulation within a set of logical rules of the bits of the word to be modified may be effected. For the convenience of the reader, there is next included in Table I showing possible combinations of bits 12–15, listed against Boolean notations for the function and a common name for the function which is effected by each particular combination of 0's and 1's for a representative case, namely, where the resultant register is the accumulator.

*Table I*

| Bits | | | | Boolean Expression | Functional Name |
|---|---|---|---|---|---|
| 12 | 13 | 14 | 15 | | |
| 0 | 0 | 0 | 0 | 0 | Clear resultant. |
| 0 | 0 | 0 | 1 | $A \cdot Acc$ | Logical multiply. |
| 0 | 0 | 1 | 0 | $A \cdot \overline{Acc}$ | Complement and logical multiply. |
| 0 | 0 | 1 | 1 | A | Load accumulator. |
| 0 | 1 | 0 | 0 | $\overline{A} \cdot Acc$ | Complement and logical multiply. |
| 0 | 1 | 0 | 1 | A | No change. |
| 0 | 1 | 1 | 0 | AvAcc | No compare and set. |
| 0 | 1 | 1 | 1 | AvAcc | Logical add. |
| 1 | 0 | 0 | 0 | $\overline{A} \cdot \overline{Acc}$ | Complement and logical multiply. |
| 1 | 0 | 0 | 1 | A=Acc | Compare and set. |
| 1 | 0 | 1 | 0 | $\overline{Acc}$ | Complement accumulator. |
| 1 | 0 | 1 | 1 | $A v \overline{Acc}$ | Complement accumulator and logical multiply. |
| 1 | 1 | 0 | 0 | $\overline{A}$ | Load accumulator negative. |
| 1 | 1 | 0 | 1 | $\overline{A} v Acc$ | Complement A reg and logical add. |
| 1 | 1 | 1 | 0 | $\overline{A} v \overline{Acc}$ | Complement A reg and accumulator and logical add. |
| 1 | 1 | 1 | 1 | 1 | Clear accumulator and complement. |

DETAILED DESCRIPTION

Figure 3:
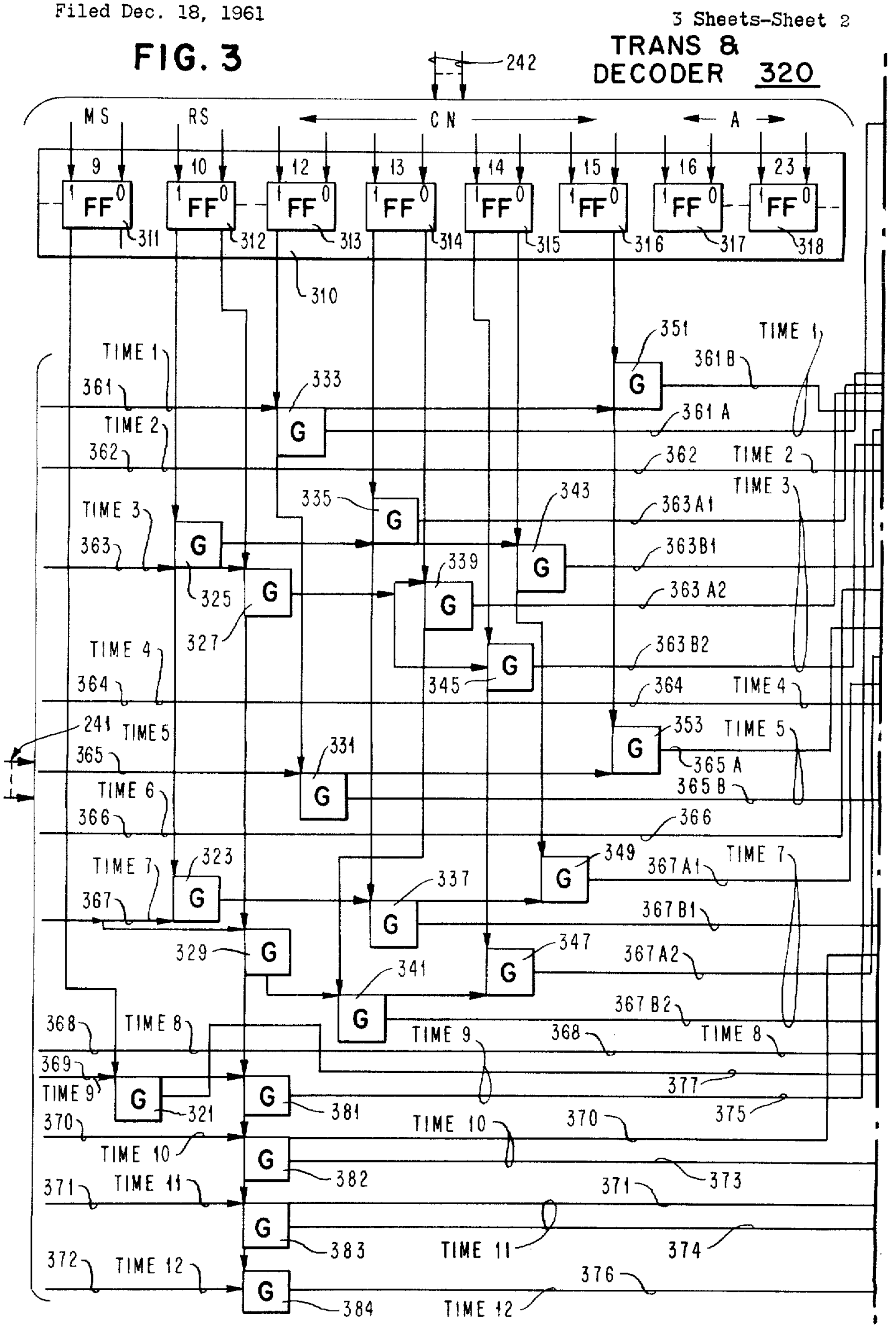
FIG. 3 shows a schematic representation of a part of an instruction register and a so-called transfer and distribution gate set within the instruction control element of a computer.

Referring next to FIG. 3, it is to be seen that the outputs of the flip-flops of register 310, in which the bits of a CONNECT instruction are assumed to have been written, are coupled to the conditioning inputs of various gates, such as 321, within Transfer and Distribution Gates 320. The aforementioned pulses incoming to Gates 320 over the conductors indicated collectively in FIGS. 1 and 3 as 241 also are shown individually in FIG. 3 as conductors 361 through 372. In the following description it is assumed that Command Generator 240 and Class Control Gates 230 are effective for producing on demand pulses in spaced time relationship to each other upon indivdual ones of conductors 361 through 372, and further that these pulses occur in the same time sequence as the order from top to bottom in which conductors 361 through 372 are shown in FIG. 3. Thus, a first pulse appears on conductor 361 and is followed by a pulse on conductor 362, etc. It also is assumed that a relationship exists between the operation of Time Pulse Distributor 250 and Instruction Register 310 such that a sequence of the conductors 241 pulses is furnished to Transmission and Distribution Gates 320 only after the previously described bits have been written into the various flip-flops, such as 311, 312, etc., of register 310. For purposes of description only, pulses on conductors 361 through 372 are referred to as occurring in specific time intervals or "command times." Thus a pulse is said to occur on conductor 361 at "time 1," conductor 362 at "time 2," etc.

*Generation of commands.*—From inspection of FIG. 3 it is to be seen that the pulse commands are provided on certain of the outputs of transfer and decoder gates 320 at the various time intervals indicated in Table II.

*Table II*

| Time | Sense | | Complement | Other |
|---|---|---|---|---|
| | Input A | Input B | | |
| 1 | 361A | 361B | | |
| 2 | | | 362 | |
| 3 | 363A1<br>363A2 | 363B1<br>363B2 | | |
| 4 | | | 364 | |
| 5 | 365A | 365B | | |
| 6 | | | 366 | |
| 7 | 367A1<br>367A2 | 367B1<br>367B2 | | |
| 8 | | | 368 | |
| 9 | | | | 377, 375 |
| 10 | | | | 370, 373 |
| 11 | | | | 371, 374 |
| 12 | | | | 376 |

The occurrence of pulses on certain Gate 320 output conductors identified in Table II under the column "Complement" (and which are used for complementing and recomplementing the flip-flops of a register 410 and accumulator 430 in a manner described presently) are unconditional: i.e., these commands are generated in the times indicated regardless of the condition in which the gates within Transfer and Distribution Gates 320 have been placed. Commands supplied on certain other of the Gate 320 output conductors and identified in the Table II headings of "Sense Input A" and "Sense Input B" are used to direct the sensing apparatus within Connect Gates 450 of arithmetic element 400 which is to be described presently. The latter class of commands are grouped as indicated in Table II for reasons to be made apparent presently; further, these commands are generated on the basis of the conditioning of gates within Transfer Distribution Gates 320, which, in turn, are selectively conditioned in accordance with the value of bits of the instruction word written into register 310. For instance, at time 1 a pulse on input conductor 361 samples the condition of gates 333 and 351, which gates are conditionable from the 1 sides of flip-flops 313 (bit 12) and 316 (bit 15), respectively, of register 310. In the event that a "1" has been written into bit 12, flip-flop 312 and a 0 written into bit 15 flip-flop 316 and gates 333 and 351 accordingly conditioned, the gates are effective for producing at time 1 sensing commands or pulses on output conductors 361A and 361B, respectively. In like manner certain other of the gates in the Transfer and Distribution Gates 320 are conditionable to produce other sensing commands. The relationship of the sensing commands to the conditions of the flip-flops 312–316 of register 310 and gate circuits of Gates 320 is expressed in Table III.

*Table III*

| TIME | REG 310 | | | | | COMMAND ON | FROM GATE |
|---|---|---|---|---|---|---|---|
| | FF312 (Bit 10) | FF313 (Bit 12) | FF314 (Bit 13) | FF315 (Bit 14) | FF316 (Bit 15) | | |
| 1 | | 1 | | | | 361A | 333 |
| 1 | | | | | 1 | 361B | 351 |
| 3 | 1 | | 1 | | | 363A1 | 335 |
| 3 | 1 | | | 0 | | 363B1 | 343 |
| 3 | 0 | | 0 | | | 363A2 | 339 |
| 3 | 0 | | | 1 | | 363B2 | 345 |
| 5 | | | | | 1 | 365A | 353 |
| 5 | | 1 | | | | 365B | 331 |
| 7 | 1 | | | 0 | | 367A1 | 349 |
| 7 | 1 | | 1 | | | 367B1 | 337 |
| 7 | 0 | | | 1 | | 367A2 | 347 |
| 7 | 0 | | 0 | | | 367B2 | 341 |

Since the relationship between the condition of the individual gate at which the command identified in Table III is generated and the condition of the appropriate register 310 flip-flops is obvious in the light of the example described above, it is not considered necessary to repeat in detail the exact manner in which each gate identified in Table III generates commands.

Returning to the consideration of commands identified in Table II, the commands listed under the column "Other" of that table are generated at times 9, 10, 11 and 12. At time 9 there is generated a command on conductor 377 via gate 321 which is conditioned on the presence of a 1 in flip-flop 311 (MS bit 9) of register 310 and a command on conductor 375 via gate 381 which is conditioned on the presence of a 0 in flip-flop 312 (RS bit 10) of register 310. At time 10 there is generated an unconditional command on output conductor 370 and a command on conductor 373 via gate 382 conditioned on the presence of a 0 in flip-flop 312. At time 11 an unconditional command is generated on output conductor 371 and a command is generated on conductor 374 via gate 383 which is conditioned on the presence of a 0 in flip-flop 312. At time 12 a command is generated on output conductor 376 via gate 384 which conditioned on the presence of a 0 in flip-flop 312.

Figure 4:
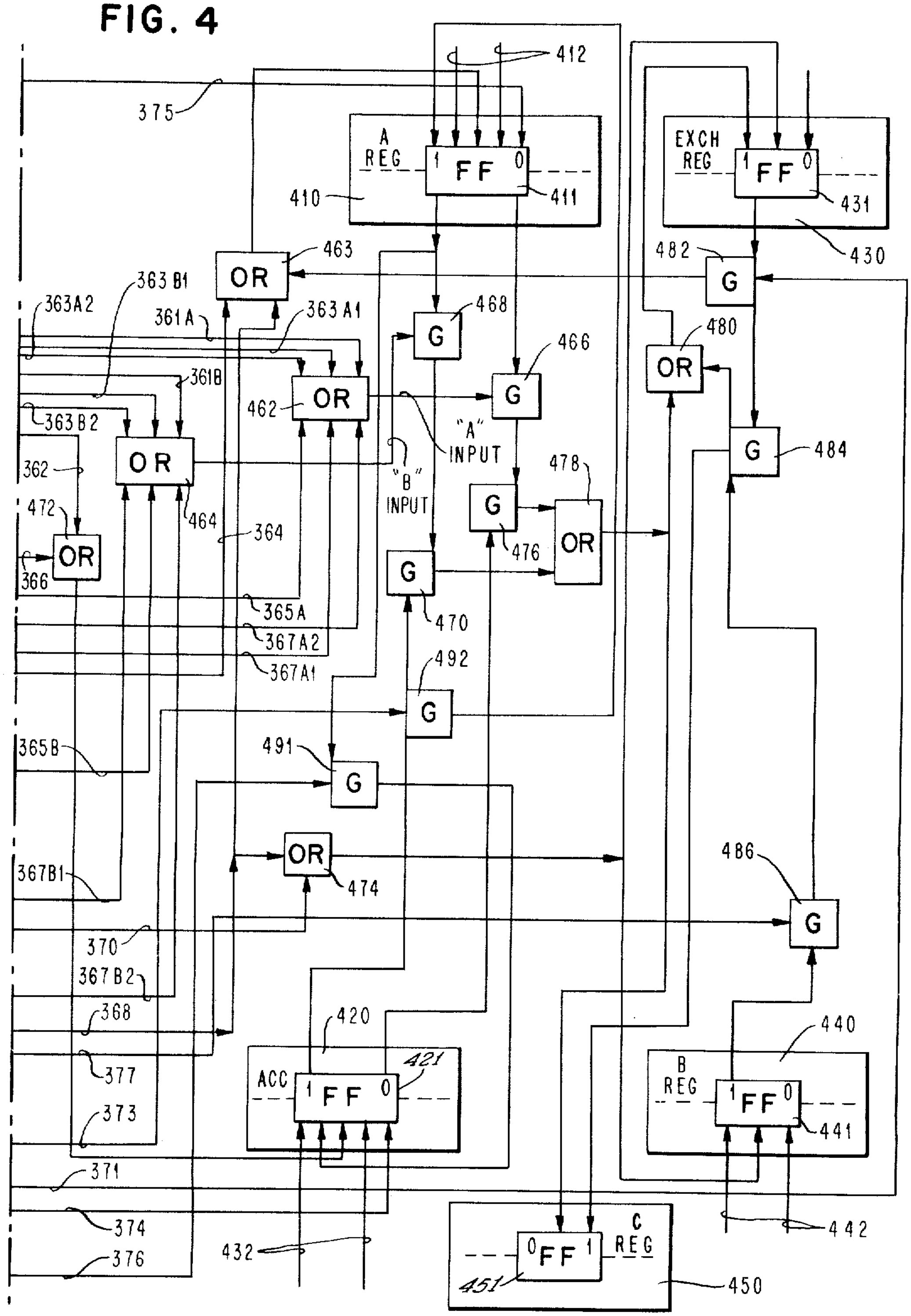
FIG. 4 shows a part of the arithmetic element of a computer and includes a schematic representations of the so-called Connect Gates which are controlled from the gate set of FIG. 3 (with FIGS. 3 and 4 arrayed as indicated in FIG. 3*a*) as well as a group of registers among which are stored data to be used during the performance of a logical manipulation operation.

*Sensing within the arithmetic element.*—Having described the sequence in which transfer and distribution gates 320 are effective to produce the various commands dictated by the value of the instruction word placed in register 310, attention next is directed to the arithmetic element 400 apparatus shown in FIG. 4 in which the described command set is used. From the preceding description, it is to be recalled that the various element 400 registers, such as A register 410, accumulator 420, and B register 440, already have been loaded in accordance with the stored program of the computer with data and other information to be used in the course of the logical manipulation operation dictated by the command set derived from the particular CONNECT instruction currently and generated in Instruction Control Element 300. At this point it is reiterated that Exchange Register 430 and C Register 450 have been cleared in anticipation of the CONNECT instruction under the control of the stored program. The term clearing is intended to mean the setting of all storage elements (flip-flops) within a register to zero. Since such a clearing operation is well understood and does not form a part of the present invention, it is not considered necessary to describe the clearing process in other than general terms.

The description which follows and which is illustrated by reference to FIG. 4 is confined to the case where each of the two data sets to be used as operator and operand in the logical operation next described is considered to include only a single bit. Accordingly, each of registers 410 and 420 as well as registers 430, 440 and 450 is shown in the drawing as containing only one flip-flop storage element. However, it is to be understood that this is a simplification for purposes of demonstrating the present invention, and further that in practice data to be modified might reasonably be expected to include any number of bits. Under the latter conditions, those skilled in the art will recognize that each of the aforementioned registers would contain as many flip-flops and sets of CONNECT gates (similar to the set described below) as there are bits to be modified, and further that the interrelationship among corresponding additional flip-flops in each of the registers and the additional gate sets would be exactly the same as the relationship described in the illustration of the invention next following. Such additional gate sets and companion apparatus (such as flip-flops within exchange register 430 and within B register 440) would operate in parallel with the next-described gate set and its companion apparatus.

It is to be seen that at the outset of the performance of the CONNECT instruction, the data to be modified and the modifier data to be used in the logical manipulation which has been stored in the corresponding (pair of) flip-flops 411 and 421 of registers 410 and 420 may be in any combination of the binary numbers 0 and 1. It is an object of the present invention to be able to regard the data expressed in either register 410 or 420 as the data to be modified (i.e., the operand) and the other data set stored in either register 420 or 410, respectively, as the modifier (operator) data and to direct the manipulation in accordance with the relationship set out in the previously described instruction word. Accordingly, there is provided sensing apparatus for each pair of register 410 and register 420 flip-flops (411 and 421 in the illustrated case). This sensing apparatus includes gates 466, 468, 470 and 476, the conditioning inputs of gates 466 and 468 being connected to the 0 and 1 outputs, respectively, of flip-flop 411, and the conditioning inputs of gates 476 and 470 being connected to the 0 and 1 outputs, respectively, of flip-flop 421. It is the function of the sensing apparatus to generate a signal (pulse) which represents the difference in value between the logical resultant bit and the value expressed in the corresponding flip-flop of register 410 or 420 which has been selected to express the value of the operand and later the resultant.

The sensing apparatus gates 466 and 476 (conditioned from the 0 sides of flip-flops 411 and 421, respectively) are serially connected. Consequently, a pulse applied to the sample input of gate 466, which may be hereinafter referred to as input A of the sensing apparatus, is effective to produce a pulse at the output of gate 476 only when the arrival of the pulse at input A finds flip-flops 411 and 421 both set to a particular (0, 0) combination. Similarly, gates 468 and 470 are serially connected, so that a pulse applied to the sample input of gate 468, which may be referred to hereinafter as input B of the sense apparatus, is effective to produce a pulse at the output of gate 470 only when the arrival of the pulse at input B finds flip-flops 411 and 421 set to another particular (1, 1) combination. The outputs of gates 470 and 476 are combined in OR circuit 478 in order to allow signals generated by the sensing apparatus to be stored in a manner hereinafter described. It is pointed out that in the present apparatus, only the gates associated with input A are necessary to accomplish the desired function of data bit manipulation. For reasons that are to be made apparent, the sensing apparatus associated with input B is used exclusively for checking purposes.

In order to carry out the functions of (a) determining the combination of digits expressed in flip-flops 411 and 421 and (b) directing the modification of operand data in accordance with logical rules, each of the commands (which, it will be recalled, represents the value of the desired resultant bit for particular combinations of operand and operator values as expressed in bits 12 through 15 of the instruction word), register 410 flip-flop 411 and register 420 flip-flop 421 are advanced from combination in which they have been originally placed under program control through a cycle of all possible combinations taken in predetermined sequence, the advance being stopped when all possible combinations of operated states of the flip-flops have been achieved and the flip-flops restored to the state in which they had been set under program control. This is effected by first complementing flip-flop 421 and then flip-flop 411; and thereafter recomplementing flip-flop 421 and then recomplementing flip-flop 411. To this end, output conductors 362 and 366 of the Transfer and Distribution Gates 320 are coupled through OR circuit 472 to the complement input of flip-flop 421. The unconditional commands generated on those conductors at command times 2 and 6 complement and recomplement flip-flop 421. Similarly, output conductors 364 and 368 are coupled through OR circuit 463 to the complement input of flip-flop 411. The unconditional commands generated on those conductors at command times 4 and 8 complement and recomplement flip-flop 421.

By advancing flip-flops 411 and 421 in a regular pattern through a complete cycle of operations under the control of a single set of commands generated at times 2, 4, 6 and 8, it is to be seen that from any given original combination of states in flip-flops 411 and 421, a predictable number of steps in the cycle must take place in order to place those flip-flops in a single predetermined combination of states. For instance, with the illustrated flip-flop 421 placed in 0 state and flip-flop 411 placed in 1 state, under the above named conditions flip-flops 421 and 411 are advanced to the particular combination of 0 in flip-flop 411 and 0 in flip-flop 421 after three steps of a cycle have been completed (i.e. only after flip-flop 421 has been complemented, 411 complemented, and flip-flop 421 recomplemented). Further, it is to be seen that after being advanced through a complete cycle of combinations, flip-flops 421 and 411 of registers 410 and 420 express the combination of values (0, 1) originally placed therein under program control.

In order to cause gates 466 and 476 to generate in response to the occurrence of a single set of commands from gates 320 a signal representing the difference in value between the desired resultant and the value originally expressed in the operand, output conductors 361A, 363A1, 363A2, 365A, 367A1, and 367A2 from Distribution and Transfer Gates 320 are coupled by OR circuit 462 to input A of the above described sensing apparatus. The command appearing on any one of the above named conductors at a particular command time causes the sensing appartus to test at that command time for the existence of a particular combination of signals originally expressed in flip-flops 411 and 421, and to cause gates 466 and 472 to produce an output signal expressing the value by which the value expressed by the operand must be changed in order to express the desired resultant. It is pointed out that this series of tests is executed during the cycling operation of the registers 410 and 420, and that each test is executed only after the flip-flops have come to rest at the conclusion of a particular cycle step.

By way of illustration, the case where flip-flop 411 has been set to 1 and flip-flop 421 has been set to 0 under program control is continued. In the continuation it is assumed that the connected instruction bits 12, 13, 14 and 15 set into register 310 are 0, 0, 1, and 0, respectively. It also is assumed that the Register Selector bit set into flip-flop 312 of the same register is set to 0. From the previous description of the instruction word, it is to be recalled that under this set of conditions the bit resulting from logical manipulation is to be written into accumulator 420 (from the fact the RS bit 10 equals 0) and that only in the event a 1 originally had been expressed in flip-flop 411 and a 0 in flip-flop 421 is the resultant bit in accumulator 420 to be a 1. Therefore, in the presently considered example, it is necessary to change the 0 written into flip-flop 421 to a 1. Accordingly, the sense apparatus associated with the A input is sampled at command time 7 by the command placed on conductor 367A2, which command finds both gates 466 and 472 conditioned. Consequently, an output pulse is produced by gate 476 at command time 7.

*Checking operation.*—By way of description of the use of sensing apparatus associated with the above described input B, it is pointed out that serially connected gates 468 and 470 are conditioned from outputs of flip-flops 411 and 421 which are conjugate with respect to the outputs from which the A input gates 466 and 476 are conditioned. It is to be seen from the configuration of the command inputs to A and B that for every pulse derived as the result of an application of a command to input A, that a conjugate pulse is generated at a different command time at the output of the apparatus associated with input B. Thus in the case illustrated, the command occurring at time 3 is conveyed over conductor 363B2 to sensing apparatus input B and results in an output signal at gate 470. The difference-indicating pulse derived from input A and the checking pulse derived from input B which have been passed through OR circuit 478 are applied to the complement input of C register flip-flop 451. Consequently, that flip-flop is complemented and recomplemented by the first- and second-occurring pulses in the event the equipment is functioning normally.

The complementing and recomplementing of flip-flop 451 serves a checking function on (a) the operation of Transfer and Decoding Gates 320 and (b) the operation of the above described sensing apparatus. Since the pulses at the output of OR circuit 478 occur in pairs when the apparatus is functioning normally, it can be assumed at the conclusion of the operation of the sensing apparatus that the flip-flops of the C register including 451 must be set to 0 if the apparatus is functioning correctly, and that any other condition at such time indicates the occurrence of an error. While the apparatus for checking the conditions in which the register 450 flip-flops have been placed and for generating alarm signals is not shown, such apparatus is well known to those skilled in the art. Further, it is to be realized that other, more sophisticated checking apparatus might also be included, but that this illustration is sufficient to demonstrate the usefulness of the present invention in the general matter of checking logical operations.

*Storage of the difference-indicating pulse.*—Having shown how a pulse indicating a change in the value expressed in the operand register is derived from commands applied to Input A, the storage of such a pulse is next considered. A pulse produced by the sensing apparatus driven from the above described input A is stored in flip-flop 431 of previously cleared Exchange Register 430. This is done by conveying any pulse from the output of the above described OR circuit 478 through OR circuit 480 to the 1 input of flip-flop 431. Consequently, flip-flop 431 is shifted from its 0 to its 1 state at this time and generates at its 1 output a signal expressive of the difference in value between the operand data bit and the data bit resulting from the manipulating operation currently in progress.

*Activity control (masking).*—Prior to describing the use made of the difference-indicating signal which has been stored temporarily in flip-flop 431 of register 430, activity or selective masking control of logical operations on operand bits is next described. It is to be recalled from the description of the instruction word that in the event the masking bit stored in flip-flop 311 of the instruction register is a 0, all bits of the operand data word expressed in the appropriate one of registers 410 and 420 are active (i.e. subject to manipulation) or else all under other types of control not pertinent to the present invention. Similarly, in the event a 1 has been set into flip-flop 311, selective operation of apparatus is to be effected which makes the manipulation of bits of the operand word subject to the selective control of bits already stored in B register 440. In the latter case, each bit expressed in register 430 is to be active (i.e. operative to modify in accordance with the value expressed therein) where a 1 bit has been written into the corresponding element of register 440. Similarly, such a bit in the operand is to be rendered inactive where a 0 has been written in the corresponding element register 440 element.

In the event a 0 is written into flip-flop 311 and all bits in the operand and operator are to be active, no mask bit command is generated on output conductor 377 at time 9, because the 0 state of flip-flop 311 deconditions gate 321 at which the last named command is generated. As a consequence, flip-flop 431 of register 430 and flip-flop 441 of B register 440 are unconditionally complemented at command time 8 and unconditionally recomplemented at command time 10. These operations of flip-flops 431 and 441 are achieved by applying pulses from conductors 368 and 370 through OR circuit 474 to the complement input of flip-flop 431 and to the complement input of flip-flop 441. As a result of complementing and recomplementing flip-flop 431, any difference bit expressed as a 1 in that flip-flop prior to command time 8 also is expressed as a 1 immediately after command time 10. Therefore, when the condition of flip-flop 431 is sampled at command time 11, a 1 expressed in that flip-flop by virtue of the operation of the above-described sensing apparatus is read out in a process yet to be described.

In the case where a mask command is present on output conductor 377 at command time 9 (i.e., after the operation of the above-described sensing apparatus and storage operations of difference signals has been completed) by virtue of the enabling of gate 321 within Transfer and Decoder Gates 320, the bit masking operation is carried out by erasing from bit positions indicated as being inactive any difference-indicating signal now stored in register 430. Accordingly, the pulse on conductor 377 samples the condition of flip-flop 441 within register 440 (which corresponds to flip-flops 411 and 421 of registers 410 and 420, respectively) at gate 486, which is conditioned from the 1 side of that flip-flop. It is pointed out that at command time 9 an inactive bit indicated by a flip-flop of register 440 is expressed as a 1 by virtue of the above described complementing of such flip-flop at command time 8. Consequently, a pulse generated at the output of gate 486 at command time 9 is used to insure the presence of a 0 in corresponding flip-flop 431 of exchange register 430 prior to command time 11. The manner in which the latter operation is effected is next described.

It is pointed out that a difference-indicating bit written into flip-flop 431 prior to command time 8 has been changed to a 0 by complementing flip-flop 431 in the above described manner at command time 8, and similarly that a "no difference" indicating 0 allowed to remain in flip-flop 431 prior to command time 8 is expressed by the flip-flop as a 1 upon the above described complementing of the flip-flop at time 8. A masking pulse issued in the above-described manner from the output of gate 486 at command time 9 shifts flip-flop 431 to its 1 state by applying the signal derived from gate 486 through OR circuit 480 to the 1 input of flip-flop 431. As a consequence, the recomplementing of exchange register flip-flop 431 at command time 10 in the above described manner shifts flip-flop 431 to its 0 state, therewith indicating that for the bit of the operand data word no change in status is to be made in a subsequent operation. It is pointed out that the same pulse from gate 486 also samples the condition of gate 484, which is conditioned from the 1 side of flip-flop 431, just prior to the above described shifting operation of that flip-flop. A pulse derived from gate 484 may be used in a number of ways; for instance, setting C register flip-flop 451 to its 1 state, so that consequently register 450 may be used for a purpose such as deriving a parity bit for the resultant word.

*Derivation of resultant bits.*—For purposes of description it is next assumed that (a) all sense operations, (b) storing of the difference-indicating bits, and (c) masking operations have been completed. At such a time the 1 expressed in flip-flop 431 of exchange register 430 represents (a) the identity of the operand bit to be modified, and (b) the value by which such a corresponding operand bit is to be modified in order to express the desired value of the resultant.

Such modification is effected in A register 410. From the foregoing description it is to be seen that when a 1 bit is set into flip-flop 312 of register 310, the word loaded into register 410 is to be the operand and is to be modified to express the resultant data word. To the end of effecting such modification, the 1 bits stored in elements of register 430 are used to complement the corresponding flip-flops of register 410 (in which the operand now is expressed). Accordingly, the unconditional command generated at time 11 on conductor 371 samples gate 482, which in turn is conditioned from the 1 side of flip-flop 431. In the event that a 1 has been stored in that flip-flop in the previously described manner, the resulting pulse produced at the output of gate 482 is applied through OR circuit 463 to the complement input of corresponding flip-flop 411 within register 410. In this manner the values expressed by the various flip-flops of register 410 immediately after time 11 represents the logical resultant.

There is next described the transfers of data between registers 410 and 420 which take place prior to and after the above described derivation of resultant bits in order to derive a resulting data word in the case where the operand originally loaded into the arithmetic element has been expressed in Accumulator 420. Because the combination of the operand bits with the difference bits expressed in Exchange Register 430 is carried out in A register 410, it is to be seen that in the presently considered case the contents of Accumulator 420 must be transferred to register 410 prior to command time 11. To this end, the following operations are effected.

Assuming that the operand word is expressed in Accumulator 420 as indicated by the insertion of a 0 in flip-flop 312 of register 310, it is to be seen in FIG. 3 that gates 381, 382, 383 and 384 conditioned from the 0 side of that flip-flop are enabled. Consequently, commands are generated on the outputs of gates 381, 382, 383 and 384 at command times 9, 10, 11 and 12, respectively, under these circumstances. The command generated at time 9 by gate 381 is transmitted via conductor 375 to the 0 input flip-flop 411 and therewith clears A Register 410 in anticipation of moving the contents of Accumulator 420 into register 410.

At command time 10, the pulse generated at gate 382 samples gate 492, which is conditioned from the 1 side of flip-flop 421 within Accumulator 420. Consequently, a 1 originally loaded into flip-flop 421 is manifested as a pulse at the output of gate 492. The latter pulse is applied to the 1 input of corresponding flip-flop 411 within A Register 410. In this manner, the operand word originally expressed in Register 420 now also is expressed in A Register 410.

At command time 11 (which, it will be recalled, is the time of modification of data bits within register 410) the pulse generated at gate 383 is applied through conductor 374 to the 0 input of Accumulator 420 flip-flop 321 in order to clear Accumulator 420. Consequently, flip-flop 421 is therewith set to 0 state in anticipation of receiving resultant data word from A Register 410.

Assuming that the modification operation on data shifted into A Regiser 410 has taken place, the command generated at the output of gate 384 at command time 12 is applied under conductor 376 to the sample input of gate 491. The latter gate is conditioned from the 1 side of flip-flop 411 within register 410. As a consequence, the resultant data word derived in register 410 now has been shifted to Accumulator 420 because any resultant 1 bit expressed within A Register 410 element just prior to time 12 is written as a 1 into the corresponding element of Accumulator 420 at time 12.

*Summary.*—In the foregoing description of the preferred embodiment of the present invention it has been shown how a data word which is loaded under program control into either Accumulator 420 or A Register 410 of Arithmetic Element 400 may be used as the operand. It is pointed out that in a computer of the type described in connection with this preferred embodiment, this feature is particularly advantageous for a number of reasons, for instance it allows the operand word stored in the Accumulator to be undisturbed until the operation has been completed. Further, each of several operands loaded into the A Register 410, may be revised to a resultant data word, moved out to a storage within other computer elements, and immediately replaced by another operand to be modified by the same operator data already stored in the Accumulator. It further has been shown how the invention is particularly adapted to masking operations by bit and to internal checking.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for manipulating data which includes first and second means operative for producing signals expressive of first and second sets of data, respectively, and wherein the data set expressed by one of said means is to be modified to yield a set of resultant data which is a function of the value of said data sets as well as a selected one of a set of logical rules, means for selecting one of said first and said second means to express a set of resultant data, means operative for generating a set of command signals in accordance with a selected logical rule.

sensing means conditioned by signals from said first and said second means in accordance with the value of data expressed therein and operated under control of command signals, produced by said generating means to produce signals expressing the difference between the value of data expressed by the selected one of said first and said second means and the value of data resulting from the manipulation in accordance with the selected rule, other means for storing the signals produced by said sensing means, and combining means operative in response to signals stored by said other means for directly causing the selected one of said first and said second means to generate signals expressing data resulting from the application of the selected logical rule set to data originally expressed therein.

2. The apparatus set fourth in claim 1 and having an addition masking means directively operative prior to the operation of said combining means for erasing signals stored in said other means, whereby manipulation of data originally expressed by said first and said second means is further controlled in accordance with the operation of said masking means.

3. Apparatus for manipulating data which includes first and second registers, each of said registers having at least one element directively operative for producing signals expressive of data written therein, and wherein the set of data expressed in one of said first and said second register elements is to be modified to express resultant data which is a function of the value of data sets expressed in said first and said second register elements as well as a selected one of a set of logical rules, means operative for selecting one of said first and said second registers to express a set of resultant data, means operative for generating a set of command signals in accordance with a selected logical rule, sensing means conditioned by signals from said first and said second register elements in accordance with the value of data expressed therein and operative under the control of command signals produced by said generating means to produce signals expressing the difference between the value of data expressed by the selected one of said first registers and the value of data resulting from the logical manipulation, other means for storing the signals produced by said sensing means, and combining means operative in response to signals stored by said other means for directively causing the element of the selected one of said registers to generate signals expressing data resulting from the application of the selected logical rule set to data originally expressed by said first and said second register elements.

4. The apparatus set forth in claim 3 and having in addition masking means directively operative prior to the operation of said combining means for erasing signals stored in said other means, whereby manipulation of data originally expressed in said first and second register elements is further controlled in accordance with the operation of said masking means.

5. In a computer having arithmetic and instruction control elements, wherein said arithmetic element includes first and second registers for receiving data words, said registers having like numbers of storage elements, each effective in response to the writing of bits of data words therein for causing each of said storage elements to produce a signal in accordance with the value of a particular data word bit, said instruction control element having a register for producing signals in accordance with a logical rule defined by an instruction word written therein and for producing signals to select one of said first and said second arithmetic element registers, a command generator including plurality of gates conditioned by signals from said instruction control element register operative for generating a series of commands representing bits resulting from the application of a logical rule expressed in an instruction word to all possible combinations of values assignable to a pair of data bits, a plurality of sensing means, each of said sensing means being individually coupled to and conditioned in accordance with the value of bits expressed in a particular one of said first register elements and a corresponding one of said second register elements, each of said sensing means having an input to which said command generator gates are coupled and an output, each of said sensing means being responsive to signals applied thereto by appropriate elements of said arithmetic element registers for generating on the output thereof a signal representing the difference between the value of the bit resulting from the operation of received commands and the value of the bit written into the element of the one of said arithmetic element registers selected by said instruction word register signals and in which the resultant bit is to be stored, a storing register in said arithmetic element having a number of storage elements, said storage register elements being equal to the number of elements in each of said first and said second registers and corresponding to the various ones of said sensing means, each of said storing register elements being individually coupled to the output of the corresponding one of said sensing means operative for producing a signal representing the value of the signal produced thereby, and means operative under the control of signals produced by said storing register elements for operating the elements of the selected one of said first and said second registers to the conditions in which the selected register elements produce signals representing a set of resultant data.

6. In a computer having arithmetic and instruction control elements, wherein said arithmetic element includes first and second registers for receiving data words, said registers having like numbers of storage elements and being effective in response to bits of data words written therein for causing each of said storage elements to produce a signal in accordance with the value of a particular word bit, said instruction control element having a register for producing signals in accordance with a logical rule and to select the one of said arithmetic element registers which is to receive the bits of a resulting word defined by an instruction word written therein, a command generator including plurality of gates conditioned by signals from said instruction control element register operative for generating a first series of commands representing bits resulting from the application of a logical rule expressed in an instruction word to all possible combinations of values assignable to a pair of data bits in accordance with the identity of the one of said arithmetic element registers in which a resultant data word is to be stored, a plurality of sensing means, each of said sensing means being individually coupled to and conditioned in accordance with the value of bits expressed in a particular one of said first register elements and a corresponding one of said second register elements, each of said sensing means having an input to which logical commands from said generator gates are coupled and an output, each of said sensing means being responsive to signals applied thereto by appropriate ones of said elements of said arithmetic elements registers for generating on the output thereof a signal representing the difference between the value of the bit resulting from the operation of received commands and the value of the data word bit written into the element of the one of said arithmetic element registers selected by said instruction control element register signals and in which the resultant bit is to be stored, a storing register in said arithmetic element having a number of storage elements equal to the number of elements in each of said first and said second registers, each of said storing register elements being individually coupled to the outputs of the various ones of said sensing means and operative for producing signals representing the value of signals produced by said sensing means, means in said arithmetic element operative in response to receipt of commands indicating the selection of said second arithmetic element register to express resultant data for transferring the contents of said second register elements into corresponding elements of said first register, and combining means operative under the control of signals produced by said storing register elements for operating the elements of said first register to the conditions in which said first register elments produce signals representing a set of resultant data.

7. The computer set forth in claim 6 wherein said command generator includes additional gates conditioned by signals from said instruction register which indicate the selection of said second register for producing still other commands, and additional means in said arithmetic element operative after the operation of said combining means and in response to the receipt of commands from said additional gates for transferring the contents of said first register elements to corresponding elements of said second register.

8. The computer set forth in claim 6 and having an addition: a fourth register in said arithmetic element having a number of storage elements equal to the number of elements in said storing register, each of said fourth register elements being operative for producing signals representing the value of a corresponding bit of an activity word written in said fourth register, and means responsive to signals of certain value produced by said fourth register elements for erasing signals stored in corresponding elements of said storing register.

9. The computer set forth in claim 8 wherein: said command generator includes another gate selectively operative in accordance with the identity of the register selected by the instruction word written into said instruction register for generating a masking command, and said erasing means is rendered operative in response to receipt of a command from said other gate.

10. In a system for determining the existence of a particular combination of quantities stored in first and second elements, where each of said elements is operable to various states and effective for producing signals uniquely defining each operated state, and where there is included loading means for directively operating each of said first and said second elements to states appropriate to the expression of first and second quantities, respectively, sensing means having conditioning inputs coupled to said first and said second elements and having in addition a control input and an output, said sensing means being conditionable upon the production of signals representing a unique combination of operated states in said elements to pass a signal from said control input to said output, a command generator including means for advancing said elements in a fixed number of steps through an ordered cycle of all possible combinations of operated states starting from and ending with the combination of states to which said elements have been operated by said loading means, said generator also including means operative upon the advance of said elements through a particular number of cycle steps for applying a signal to said control input, and means coupled to said sensing means output and operative in response to a signal produced thereat for registering the existence of a particular combination of quantities expressed in said first and said second elements by said loading means.

11. In a system for determining the combination of quantities stored in first and second elements, where each of said elements is bistable and has a complement input and first and second outputs and is effective upon operation to each of first and second stable states for producing signals on said first and said second outputs, respectively, and where there is included loading means effective for directively operating said first and said second elements to states in which signals produced on said outputs thereof express first and second quantities, respectively, sensing means including conditioning inputs coupled to said element outputs and further including a control input and an output, said sensing means being conditionable in response to the generation of signals on a particular combination of said element outputs to pass a signal from said control input to said output, command generating apparatus including in stepping means coupled to said element complement inputs to serially complement and recomplement said elements in fixed order through all possible combinations of operated states starting and ending with the states to which said elements have been operated by said loading means, said command generator apparatus further including means operative at a selected operational step of said stepping means for applying a signal to said control input of said sensing means, and means coupled to said sensing means output for storing a signal passed by said sensing means, whereby a signal registered in said storage means at the end of operation of said command generating apparatus marks the registration of the particular combination of values in said elements by said loading means characterized by the identity of the step of complementing operations at which said sensing means has been sampled.

12. In a system for determining the combination of quantities stored in first and second elements, where each of said elements is bistable and has a complement input and first and second outputs and is effective upon operation to each of first and second stable states for producing signals on said first and said second outputs, respectively, and where there is included loading means effective for directively operating said first and said second elements to states in which signals produced on said outputs thereof expresses first and second quantities, respectively, sensing means including conditioning inputs coupled to said element outputs and further including a control input and an output, said sensing means being conditionable in response to the generation of signals on a particular combination of said element outputs to pass a signal from said control input to said output, apparatus for generating commands including stepping means coupled to said element complement inputs to serially complement and recomplement said elements in fixed order through all possible combinations of operated states starting and ending with the combination of states to which said elements have been operated by said loading means, said command generator apparatus further including means operative at a plurality of selected operational steps of said stepping means for applying signals to said control input of said sensing means, and means coupled to said sensing means ouput operative for storing signals passed by said sensing means, whereby a signal registered in said storage means at the end of the operation of said command generating apparatus marks the registration of any of the combinations of values in said elements by said loading means which are characterized by the identity of those steps of complementing operations at which said sensing means has been sampled.

References Cited by the Examiner

Doman: IBM Technical Disclosure Bulletin, vol. 2, No. 4, pages 34 and 35, December 1959.

ROBERT C. BAILEY, *Primary Examiner.*

DARYL W. COOK, *Examiner.*